United States Patent [19]

Schreiner et al.

[11] 3,825,673

[45] July 23, 1974

[54] COLOR GAMUT COMPRESSOR

[75] Inventors: John H. Furrey, Schaumburg; George C. Le Crenn, Palatine, all of Ill.

[73] Assignee: Warwick Electronics Inc., Chicago, Ill.

[22] Filed: Mar. 4, 1971

[21] Appl. No.: 120,962

[52] U.S. Cl. .......... 178/5.4 HE
[51] Int. Cl. .......... H04n 9/38
[58] Field of Search .......... 178/5.4 HE, 5.4 R

[56] References Cited

UNITED STATES PATENTS

| | | | |
|---|---|---|---|
| 3,595,988 | 7/1971 | Kawamato et al. | 178/5.4 HE |
| 3,617,621 | 11/1971 | Cochran | 178/5.4 HE |
| 3,619,487 | 11/1971 | Norley et al. | 178/5.4 HE |
| 3,654,384 | 4/1972 | Kresock | 178/5.4 HE |
| 3,662,097 | 5/1972 | Rennick | 178/5.4 HE |
| 3,674,919 | 7/1972 | Garrett et al. | 178/5.4 HE |

OTHER PUBLICATIONS

Electronic Servicing, July, 1970 pp. 60–61 Electronics, 6–22–70, pp. 102–105

*Primary Examiner*—Robert L. Richardson
*Attorney, Agent, or Firm*—Hofgren, Wegner, Allen, Stellman & McCord

[57] ABSTRACT

A gamut compressor circuit in the chroma channel of a color television receiver selectively changes the effective angle between the demodulation axes of a two axis demodulation system to visually minimize hue errors in the orange (flesh tone) and cyan regions. Apparatus is also provided to substitute a reference hue control when the gamut compressor circuit is in use.

13 Claims, 6 Drawing Figures

Figure 1:
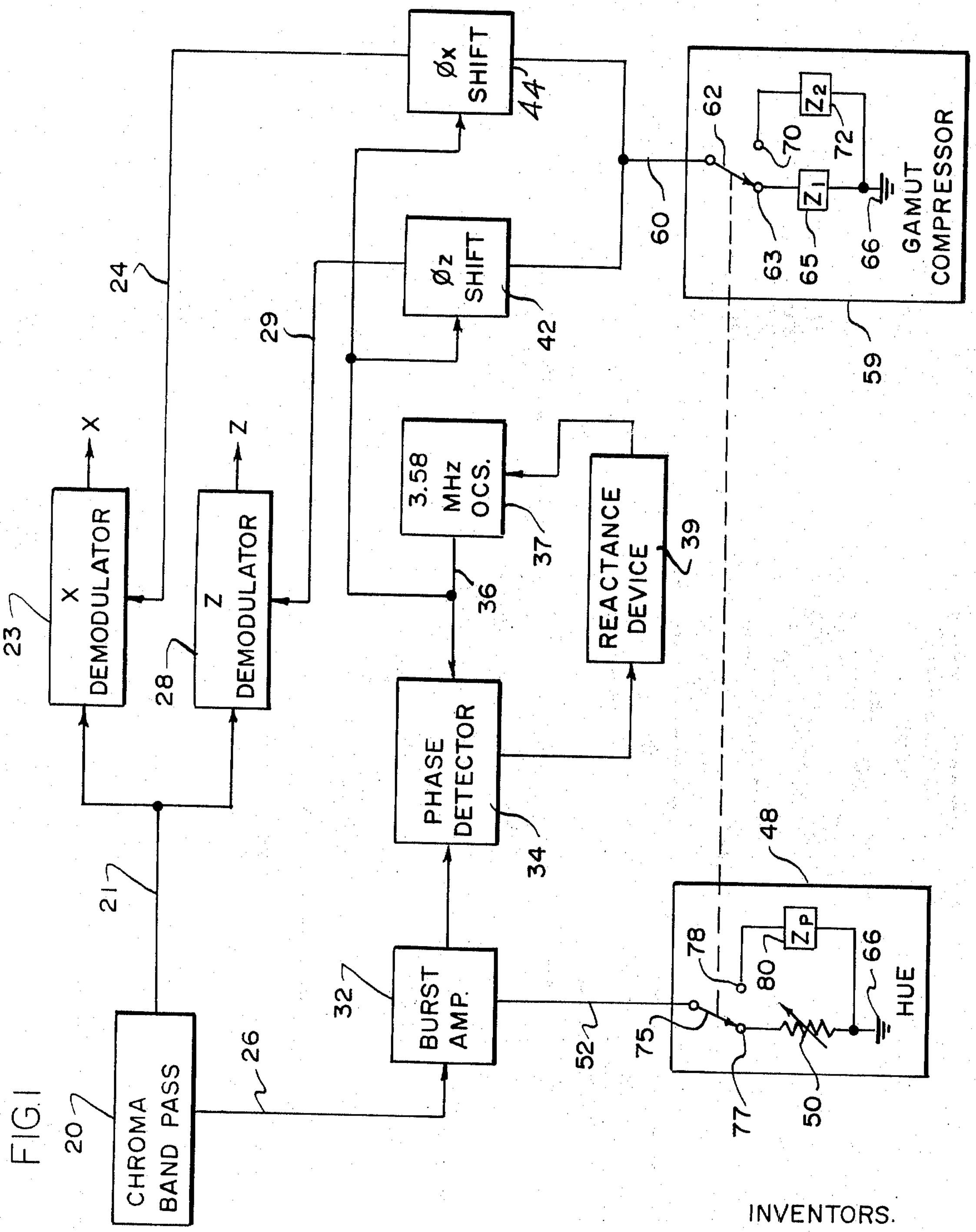

INVENTORS.
GEORGE C. LECRENN
JOHN H. FURREY
BY Hofgren, Wegner, Allen, Stellman & McCord
ATTORNEYS.

COLOR GAMUT COMPRESSOR

This invention relates to chroma demodulation in a color television receiver, and more particularly to a chrominance channel providing color gamut compression to visually minimize hue errors caused by phase distortion.

In the American Standard N.T.S.C. Color Transmission System, color hues are defined by the phase of a chrominance signal with respect to a reference or burst signal arbitrarily designated as having a phase angle of 180°. In conventional receivers the chroma channel includes at least a pair of demodulators which extract information from the received signal at a pair of demodulation axes which bear a predetermined angular relationship with respect to the burst. Matrixing circuitry is also provided to combine the demodulated information to reproduce the transmitted color difference information. Many factors contribute errors between the chroma information and burst, occurring both during transmission and reception, which shift the displayed hue or tone from the actual hue or tone of the scene being televised. This shift in hue, is caused in part by the fact the demodulation axes are also shifted with respect to the received chroma information and therefor sample the received chroma information at different angles. Visually, the most objectionable hue errors occur in the generally complementary color regions of orange and cyan. Phase changes in the orange region or hue alter the appearance of flesh tones, making such tones appear unreal to a viewer, and phase changes in the cyan region or hue alter the appearance of blues, often creating for example a green sky.

The problem of hue error in general remains to be solved for N.T.S.C. transmission. Some distortions occur at the transmitter when the burst signal and chrominance phase modulated signals are combined, particularly when switching between different color cameras. Also, compensation for new primary colors and a change in reference white at the receiver with respect to the transmitter has introduced error from the original N.T.S.C. standards.

In an attempt to visually compensate for some phase shift errors, a tint control circuit has been proposed in which the chrominance signal is sampled in the flesh tone region, phase shifted, and added in order to distort the resulting chrominance signal before demodulation. The distortion causes received chrominance signals on either side of a preset flesh tone to be reproduced as flesh tone colors. Such a tint control is objectionable for a number of reasons. The circuit is very complex and costly, and requires many active devices for gating and sampling of the chrominance signal. The sampling process generates undesired radiations which must be suppressed. Also, such a tone control circuit lacks flexibility, and visually enhances only the flesh tone region. Thus no attempt is made to compensate for a transmission error causing a green sky, for example, which is visually very objectionable due to the viewer's own knowledge of the true color of similar scenes.

In accordance with the present invention, the chrominance channel utilizes different and unique concepts to compensate for the problem of phase distortions occurring both during transmission and reception. Visually critical hues are compensated for by selective relative rotation of the angular disposition of the demodulation axes. The system visually enhances both orange and cyan regions by use of an inexpensive circuit which requires very few parts, and which does not require sampling nor active devices.

One object of this invention is the provision of an improved chrominance channel having a symmetrical color gamut compression circuit for enhancing visually critical and generally complementary hues.

Another object of this invention is the provision of an improved chrominance channel having a gamut compression circuit for selectively and relatively rotating the effective axes of demodulation to reduce errors in the reproduced complementary color regions of orange and cyan which are caused by phase distortion.

Still another object of this invention is the provision of an improved chrominance channel having a gamut compression circuit for relatively varying the phase between the demodulator reference signals which are derived from the reference burst, to thereby decrease the angle between the demodulation axes in the quadrant corresponding to the phase angle of hues which are to be visually enhanced.

Yet another object of this invention is the provision of an improved chrominance (channel) having a gamut compression circuit including a manually actuable switch for selecting at least two different phase sensitive demodulation axes.

Figure 2A:
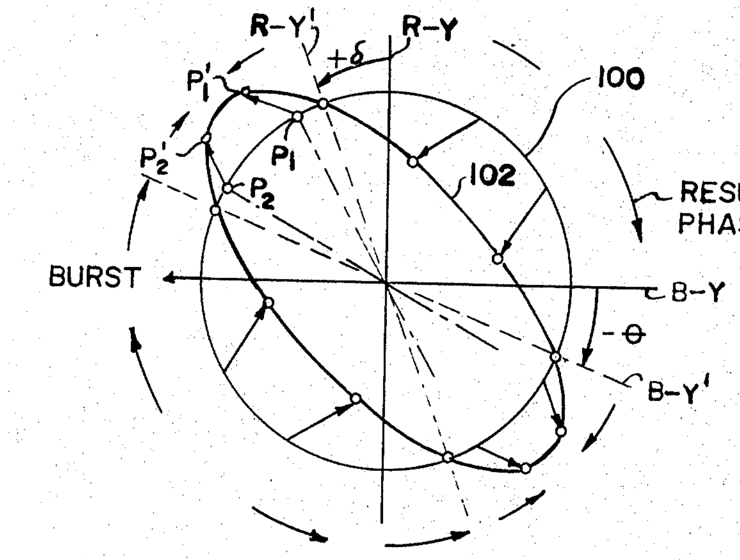
Figure 2B:
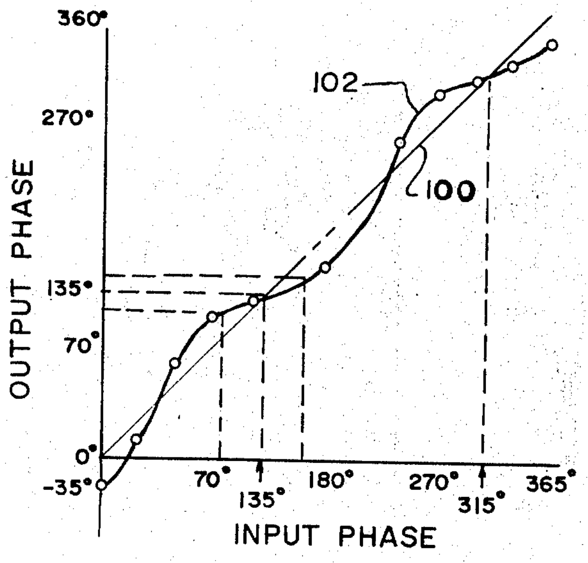
Figure 2C:
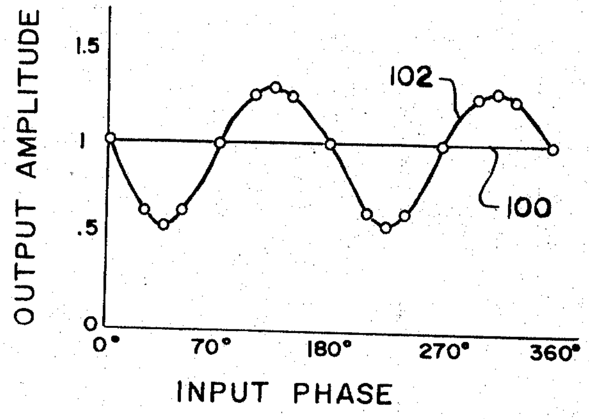
Figure 3:
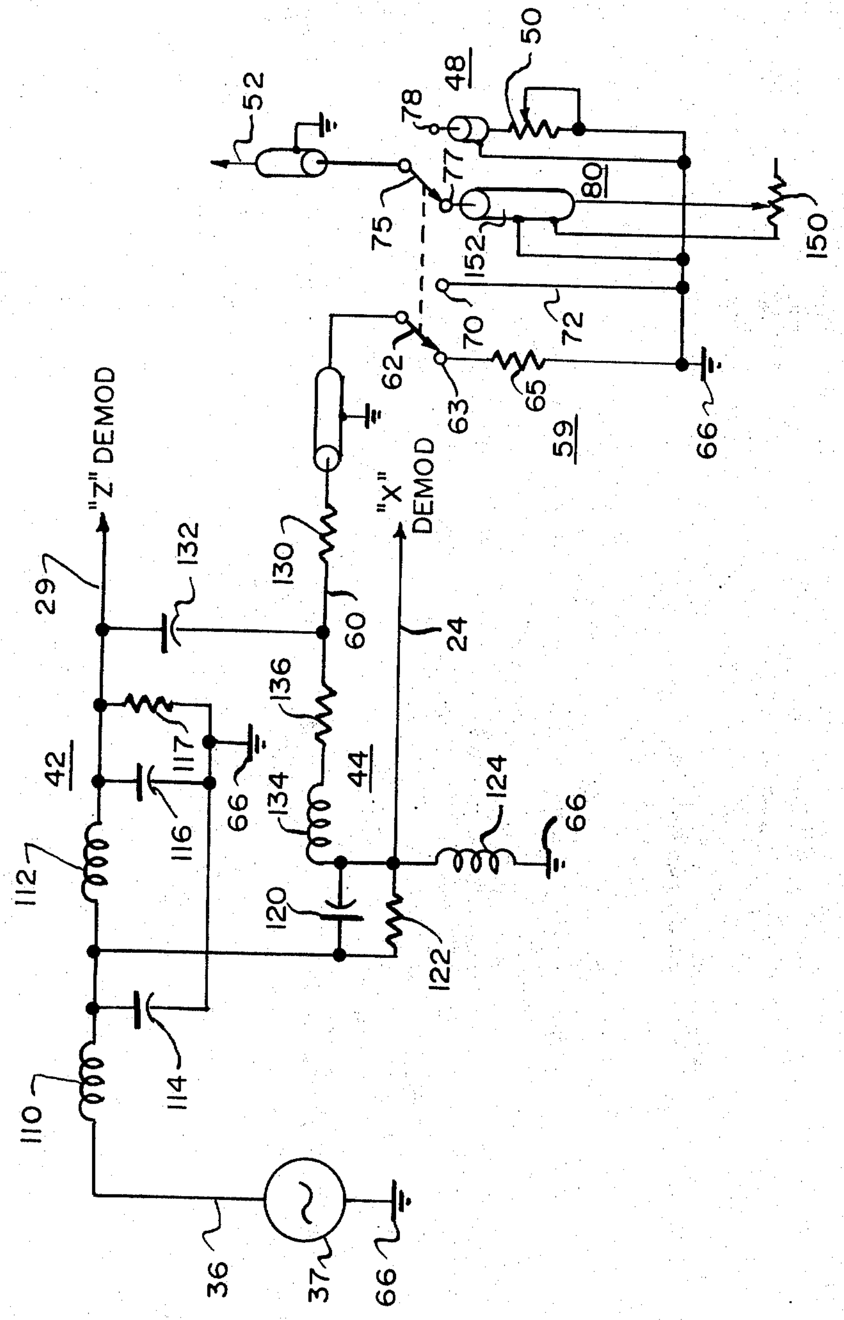
Figure 4:
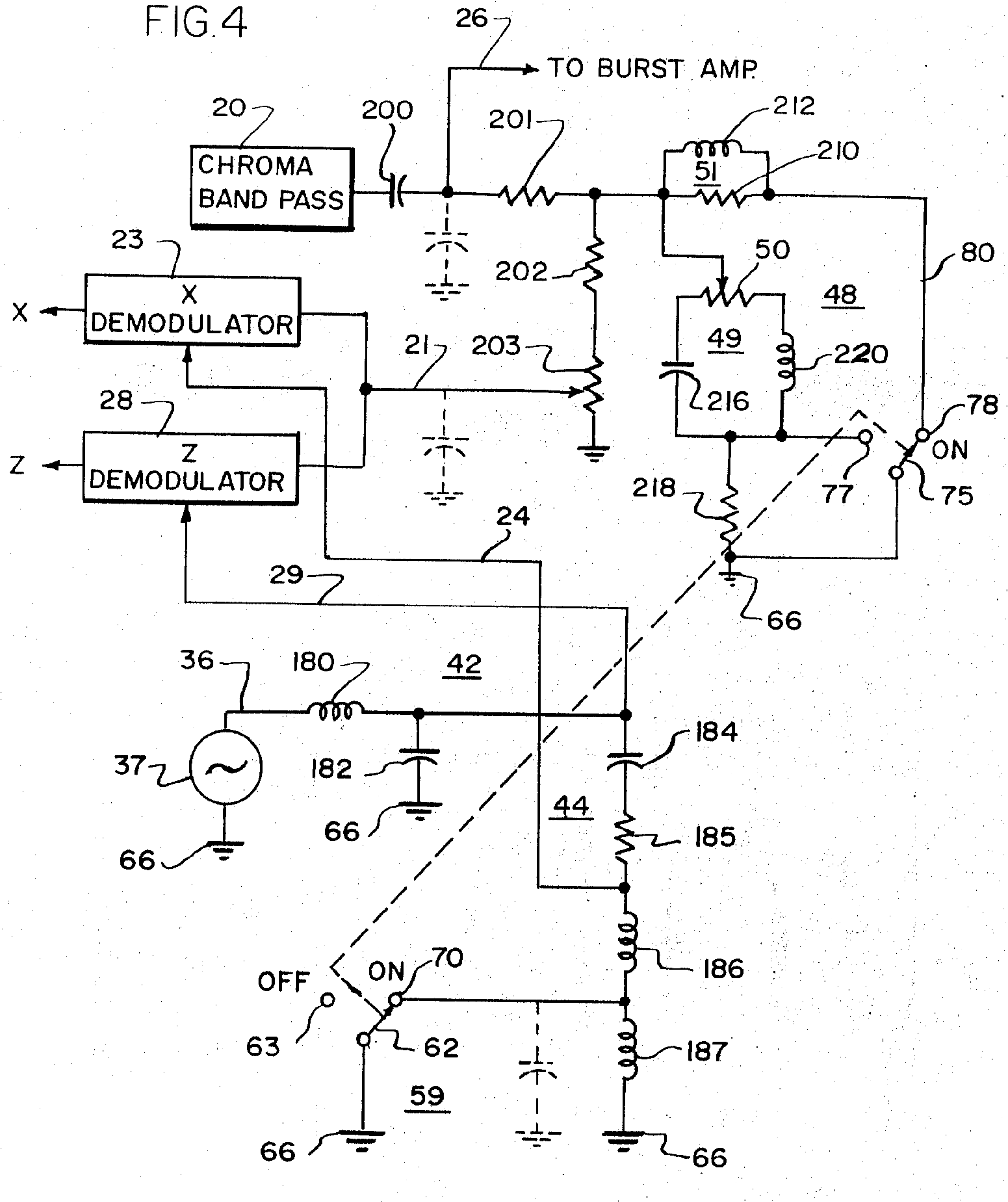

Further object and features of the invention will be apparent from the following description, and from the drawings, in which:

FIG. 1 is a block diagram of a novel chrominance channel for a color television receiver;

FIGS. 2A–C are diagrams illustrating the demodulated outputs of the chrominance channel of FIG. 1 for a normalized transmission of all hues;

FIG. 3 is a schematic diagram of the invention shown in block form in FIG. 1; and FIG. 4 is a schematic diagram of an alternate embodiment of the invention.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. Throughout the specification, values will be given for certain of the components in order to disclose a complete, operative embodiment of the invention. However, it should be understood that such values are merely representative and are not critical unless specifically so stated.

Turning to FIG. 1, a novel chrominance channel for a conventional color television receiver is illustrated. The particular chrominance channel illustrated employs a conventional X-Z demodulation system. However it is to be understood that the principals of this invention are applicable to other demodulation systems such as I-Q, R-Y - B-Y, R-Y - B-Y - G-Y, etc. A chrominance bandpass stage 20, which may include first and second chrominance amplifiers, passes to an output line 21 a conventional modulated chrominance signal. The chrominance signal is coupled to a conventional X axis demodulator 23 which demodulates along a phase angle sensitive axis corresponding to the phase angle of the demodulator reference signal on an input line 24. The reference signal is a 3.58 MHz sine wave conventionally having a phase angle of 81° in terms of the conventional N.T.S.C. system wherein the burst lies at 180°.

The chrominance output line 21 is also coupled to a conventional Z axis demodulator 28, which has an input line 29 coupled to a 3.58 MHz demodulator reference signal conventionally having a phase angle of 16° with respect to the conventional orthogonal coordinate system wherein the burst signal lies at 180°. Both the X and Z color demodulators produce outputs which have amplitudes proportional to the instantaneous component of the chrominance signal which lies along demodulation axes corresponding to the phase angles of the reference signals. The X and Z output chroma signals are then coupled to conventional matrixing circuits (not illustrated) for developing the color difference signals (R-Y), (B-Y) and (G-Y).

The matrixing circuits are of necessity designed to combine the demodulated X and Z signals in such proportions and polarity so as to produce the proper color difference signals. The particular proportion (coefficients) and polarities are determined by the particular angles of demodulation employed. Thus it can be seen that both the active demodulators and the matrixing circuits combine to determine the "effective demodulation angle" and that variations in the active demodulators or in the matrix can effect a change in the "effective demodulation angle."

The burst signal on line 26 is amplified in a burst amplifier 32 and coupled to a phase detector 34 where it is compared with the output on a line 36 of a 3.58 MHz local chroma oscillator 37. The phase difference therebetween generates an output signal which causes a reactance device 39 to shift the phase of the oscillatory signal until the local oscillator and received burst are phase locked.

The phase locked oscillator signal on line 36 is coupled to phase shift networks 42 and 44 which phase shift the oscillator signal by predetermined angles so as to produce the properly phased Z and X demodulator reference signals on lines 29 and 24 respectively. Lines 29 and 24 couple the demodulation reference signals to the Z and X demodulators respectively.

A hue control stage 48 includes an adjustable element, as a variable resistor 50, which is manually adjustable by a viewer to shift the hue of the reproduced picture. Variable resistor 50 is connected with any conventional phase shifting network (not illustrated) so that selection of different resistance values produces corresponding phase angle shifts in the burst output of the burst amplifier 32. Generally, a center adjustment of variable resistor 50 introduces no phase shift in the burst signal, thereby causing the X and Z demodulation reference signals to have phase angles which would accurately demodulate the received chrominance signal if no phase distortion errors were present.

Many phase distortion errors may occur during transmission and reception which result in a distorted reproduced color picture. In accordance with the present invention, the most visually objectionable hue errors, which occur in the orange and cyan regions, are minimized by a color gamut compressor stage 59. The phase shift networks 42 and 44 (which form a part of the gamut compressor) are coupled through a common line 60 to a viewer actuable switch 62. The wiper of the switch, when stage 59 is not operative, is connected to a terminal 63 which connects an impedance 65 between line 60 and a source of reference potential or ground 66. The value $Z_1$ of impedance 65 is selected so that the phase shift networks 42 and 44 produce the conventional Z and X reference signals having phase angles of 16° and 81° respectively, when impedance 65 is in circuit.

When a color gamut or hue compression is desired, switch 62 is actuated so that its wiper contacts a terminal 70, thereby substituting an impedance 72 for the impedance 65. Impedance 72 has a value $Z_2$ which is different than value $Z_1$, and is selected to cause phase shifts produced by networks 42 and 44 to increase, for reasons to be explained.

To insure that the demodulation axes are shifted the predetermined desired amount, the hue control resistor 50 should be effectively returned to its center or other position which removes any viewer selected tint. For this purpose, a switch 75 in hue control stage 48 is inserted between line 52 and variable resistor 50. The wiper of the switch normally contacts a terminal 77 which connects variable resistor 50 between line 52 and ground 66. When the switch 75 is actuated, the wiper contacts a terminal 78, thereby removing variable resistor 50 and substituting therefor an impedance 80 selected to eliminate any phase shift in the burst signal. Desirably, switches 62 and 75 are ganged together, and are available as a front panel viewer actuable control which upon manual actuation automatically returns the hue control to a preset calibration and simultaneously enables the gamut compressor stage 59.

It should be realized that the simultaneous resetting of the tint control to a nominal setting is not necessary to the operation of the gamut compression circuit of the present invention but is useful to enable the production of repeatable results by the circuit. It is also contemplated that the switch 62 and impedance 72 can be eliminated and a variable impedance used as impedance 65 to enable continuous control of the angle between the axes of demodulation.

The operation of the gamut compression stage 59 will be explained with reference to FIG. 2. FIG. 2A is a normalized unit circle representing the gamut of saturated colors and is referenced to vector relationships defined by the N.T.S.C. system, wherein the burst reference signal is located at 180°. The flesh tone or orange region is located in the second quadrant at approximately 135° and the complementary cyan region is of course located in the fourth quadrant of the unit circle at about 315°.

Any point on the circle 100 represents a different color which can be defined as a function of the conventional tri-color coordinates (not shown) or as a pair of coordinate values projected on the pair of axes R-Y and B-Y. R-Y and B-Y axes, rather than X and Z axes are chosen here for the sake of simplicity and clarity, and represent the effective axes of demodulation of a given system. Ideally, at the transmitter, this unit circle representation of the signal should be the same as that for the receiver. Phase distortions however cause the burst to vary in phase with respect to the chroma information which, in effect, rotates the coordinates shown in full line in FIG. 2A relative to the unit circle 100 to, in effect, cause a given point $P_1$ to move to the position $P_2$, the deference in angular position, $\alpha$, being equal to the phase error between the burst and the chroma. This clearly results in a demodulation of the received information along axes which produce incorrect color information with the result being hue error. The degree of error is proportional to the angle.

When the gamut compression stage is activated, the axes of demodulation are each shifted, for example 22.5°, further apart to thereby increase the angle between them 45°. This is illustrated by dotted lines R-Y', B-Y' in FIG. 2A. With the axis thus shifted the locus of points defined by the original coordinates of circle 100 in the unshifted coordinate system, now produce an elipse 102. It should be noted that the angle between the axis of demodulation in the third and fourth quadrant, which contain flesh tones and cyan respectively, is reduced or compressed.

This reduction of the angle between the R-Y and B-Y axis in the second and fourth quadrant in effect compresses the gamut of colors in these regions and also therefor reduces hue error caused by a phase error in the burst.

This can be more clearly seen by referring to FIG. 2B wherein a plot of input phase versus output phase for unit circle 100 and elipse 102 clearly shows a decreased slope for the compressed system in the vicinity of 135° and 315°. The decreased slope of course implies a smaller change in output phase for a given change in input phase. Thus, should the burst be out of phase by an angle $\alpha$, a point $P_1$ would appear at point $P_2$ on the unit circle in the uncompensated system. With the gamut compression circuit of the present invention activated however, the angular deference between corresponding points $P_1'$ and $P_2'$ on the elipse 102 is less than $\alpha$ which thus reduces the effect of the burst error. The system also introduces certain errors in a correctly transmitted signal by compressing the colors, or phase, in the second and fourth quadrants and expanding the color gamut or phase in the first and third quadrants. A certain degree of amplitude compression and expansion also occurs as can be seen from FIG. 2C wherein line 103 indicates a constant amplitude versus phase for the unit circle and line 102 illustrates a sinusoidally varying amplitude versus phase on the eliplical locus. This somewhat deleterious effect is outweighed however by the reduction in the visual effect on flesh tones caused by a burst-chroma phase error.

In FIG. 3, the circuits of the gamut compressor stage 59 and associated phase shift networks 42 and 44, and the hue control stage 48 of FIG. 1 are illustrated in detail. The output of Local Oscillator 37 is coupled to phase shift networks 42 and 44 by lead 36 and a phase centering circuit comprised of a 5.6 microhenry inductor 110 and an 82 picofarad capacitor 114. The phase centering circuit functions to introduce a phase lag in the oscillator signal of about 45° in order to place the reference signal at an absolute angular position approximately 45° to enable phase shift circuits 42 and 44 to introduce phase lag and phase lead in the reference signal to produce the desired X and Z demodulating reference signals.

Network 42 includes a 12 microhenry inductor 112 in series between inductor 110 and output line 29 for the Z demodulator. A 39 picofarad capacitor 116 and a parallel connected 330 ohm resistor 117 shunt line 29 to ground 66. Network 42 introduces an approximately 30° phase leg which results in a Z demodulating reference signal at an absolute N.T.S.C. angle of 16°.

Network 44 introduces an approximately 36° phase lead which results in an X demodulating reference signal at approximately 81°. Network 44 includes a 47 picofarad capacitor 120 in series between inductor 110 and line 24. Capacitor 120 is shunted by a 470 ohm resistor 122. The junction between capacitor 120 and line 24 is connected to ground 66 through a 47 microhenry inductor 124.

The phase leads and lags produced by networks 42 and 44 are partially controlled by circuitry in the gamut compressor stage 59. The output from phase shift network 42 on line 29 is coupled to a 39 ohm resistor 130 through a 180 picofarad capacitor 132. The output of phase shift network 44 on line 24 is coupled to the same resistor 130 through a series connected 15 microhenry inductor and a 470 ohm resistor 136. Resistor 130 is coupled through a shielded cable to the wiper of switch 62 and thence to ground 66 through an impedance path dependent on the setting of the wiper. When the wiper contacts terminal 63, a 390 ohm resistor 65 is inserted in series between resistor 130 and ground 66. For the particular circuit being described, impedance element 65 preferably constitutes a short circuit and therefor termianl 70 is connected through a wire conductor directly to ground 66.

The value of resistor 72 is selected such that the capacitor 132, inductor 134 and resistor 136 have little or no effect on the phase of the reference demodulator signals on lines 24 and 29. In actual design practice it should be clear that all component values, including resistors 165 and 65 must be considered in order to obtain properly phased X and Z demodulating signals.

In order to activate the gamut compression stage the wiper contact of switch 62 is moved from contact 63 to contact 70 to thereby connect the resistor 130 directly to ground. This decrease of impedance, from impedance 72 to a short circuit, substantially increases the effect of capacitor 132, inductor 134 and resistor 136 on the phase of the demodulating signals and in effect increases the phase lag in the Z demodulating signal, which in effect decreases it absolute angle and increases the phase lead in the "X" demodulating signal which, in effect, increases its absolute angular position. In other words, the angle between the demodulating signals, and consequently the demodulating axes is increased. The effect of this is very similar to example illustrated in FIG. 2 since the X and Z axes are close to the R-Y and B-Y axes. The increasing angle in the first quadrant causes a corresponding decreasing angle in the second and fourth quadrants which produces phase or gamut compression in the flesh tone and cyan regions.

Control stage 48 includes a variable resistor 50, as 1.8 kilohms which enables the hue to be restored to a center setting when the gamut compression circuit is activated. Desirably, variable resistor 50 is located on the back panel of a television receiver, or in another location generally inaccessible to the ordinary viewer, allowing only factory or field adjustment to preset a 0° phase shift. Although not preferred, control 50 could be available to a viewer to allow adjustment of the compressed hues in the flesh tone and cyan regions. Impedance 80 is formed by a 1.8 kilohm variable resistor 150 having its wiper directly connected to contact 77 through a shielded cable 152, with the shield being returned to one end of the fixed resistance of the potentiometer 150 and to ground 66. Shielded cable 152 provides a stray capacitance between terminal 77 and ground 66 and enables the control 150 to be located at the front of the receiver to enable the viewer to manually adjust tint.

In FIG. 4, another embodiment of the invention is illustrated. Elements similar to those illustrated in FIG. 1 have been identified by the same reference numeral. A local oscillator output line 36 is coupled through a phase lag network 42 to line 29. Network 42 includes a 47 microhenry inductor 180 in series between lines 36 and 29, and a 22 picofarad capacitor 182 which shunts line 29 to ground 66. This network produces an approximately 90° phase lag with respect to the sine wave from oscillator 37 or zero degree absolute phase position in the N.T.S.C. system.

A lead phase network 44 is coupled in cascade with lag network 42, and includes a 15 picofarad capacitor 184, a 150 ohm resistor 85, a 47 microhenry inductor 186, and a 10 microhenry inductor 187 in series between line 29 and ground 66. The junction between resistor 185 and inductor 186 is directly coupled to line 24. Inductor 187 is shunted to ground 66 when switch 62 has its wiper connected to terminal 70, but is in circuit when the wiper contacts an unconnected terminal 63.

When gamut compressor stage 59 is not operative, the wiper of switch 62 contacts terminal 63, and phase shift network 44 causes the X demodulating signal on line 24 to have a 75° lead with respect to the Z demodulating signal on line 29 and a 75° absolute angular position in the N.T.S.C. system. When gamut compression is to occur, the wiper of switch 62 is moved to contact terminal 70, thereby short circuiting inductor 187. Removal of inductor 187 causes the demodulating signal on line 29 to assume an absolute angular position of 105° and the X demodulating signal to assume an absolute angular position of 355°. With the gamut compressor 59 operative therefor, the X and Z demodulating reference signals will be displaced from each other by a 110° angle. This represents an increase of 35° in angular displacement of the demodulating axes.

Hue control stage 48 of FIG. 4 is modified from the corresponding stage 48 in FIG. 3. The output of the chroma bandpass stage 20 is coupled through a 60 picofarad capacitor 200, a 120 ohm resistor 201, a 100 ohm resistor 202, and a 500 ohm potentiometer 203 to ground 66. The wiper of potentiometer 203 is directly coupled to line 21, and passes the chrominance signal to the X and Z demodulators 23 and 28, respectively, with a color level corresponding to the setting of potentiometer 203. The junction between capacitor 200 and resistor 201 forms a pick off point for line 26 which connects with burst amplifier (not illustrated).

The junction between resistors 201 and 202 is coupled (through a 820 ohm resistor 210 and a 47 microhenry inductor 212) to the wiper of potentiometer 50, as 2.4 kilohms. One side of potentiometer 50 is coupled through a 150 picofarad capacitor 216 to a 120 ohm resistor 218 connected to ground 66. The other side of potentiometer 50 is coupled through a 5.6 microhenry inductor 220 to resistor 218. The junction of capacitor 216, resistor 218 and inductor 220 is directly coupled to terminal 77 of switch 75. The terminal 78 of the switch is coupled through any suitable impedance 80 to the junction between 201 and 202 through resistor 210 and inductor 212. In the present embodiment, the impedance is approximately zero ohms and couples phase shift circuit 51 in parallel with manual tint control circuit 49 when switch 75 contacts terminal 78.

When the wiper of switch 75 contacts terminal 77 resistor 218 is shorted and potentiometer 50 controls hue within a relatively wide range. When the wiper of switch 75 contacts terminal 78 (gamut compression), the hue is phase shifted approximately 20° towards its center position by connecting phase shift circuit 51 in parallel with the manual tint control 49 and by inserting resistor 218 in series between inductor 220 and capacitor 216 and ground. The insertion of resistor 218 also reduces the effective range of tint control 50. This reduction of range is desirable when the receiver is in automatic or gamut compression configuration. FIG. 4 provides generally the same advantages as the circuit of FIG. 4, but through different rotation of phase angles. It should also be noted that FIG. 4 employs a slightly modified X-Z demodulation system as can be seen from the fact that the demodulation axes are located at slightly different angles. This does not affect the operation of the system since the matrixing circuitry for the demodulator of FIG. 4 will be set up to provide the proper additions and subtractions of the modified X and Z signals to reproduce the transmitted R-Y, B-Y and G-Y color difference signals.

Although the previously described preferred embodiments of this invention produce angular shifts of both demodulation axis it is to be understood that similar results can be obtained by rotating only one axis. This introduces a degree of assymetry which however can be eliminated, if desired, by introducing an opposite rotation of both axes simultaneously by use of the tint control.

It is also to be realized that although both disclosed preferred embodiments effect relative demodulation axis rotation by phase shifting the demodulating reference signals, similar results can be obtained by relatively phase shifting the other input to the demodulators, i.e., the chrominance information, in a similar manner.

The basic principle on which this invention is based is the shift of the "effective axes of demodulation" (which constitutes a linear distortion of the received signal) to produce gamut compression in the regions of color most sensitive to the normal viewer. This shift of the "effective axes of demodulation" can be accomplished as previously indicated by varying the phase of either the demodulating reference signal inputs to the demodulator or the chrominance signal inputs to the demodulators. It is further contemplated that this shift of the effective demodulation axis can also be obtained, in effect, by changing the polarity and/or magnitude of the coefficients of combination in the matrixing circuit which produces the color difference signals. In other words, by algebraically combining selected portions of the signals from the demodulator output, the vector additions can be made to produce the same rotation of the effective demodulation axes as a phase shift of the demodulation reference signals.

We claim:

1. A chrominance channel for a received composite color television signal which includes a chrominance component having a phase variable with respect to a phase reference component to represent chrominance information, comprising:

demodulator means with at least two demodulator stages each demodulating said chrominance component along a different demodulation axis;

a reference signal means for generating a separate demodulating signal for each demodulator stage with each separate demodulating signal having a different selected phase angle with respect to said reference component, the phase difference between two of said separate demodulating signals being fixed;

phase shift means effective when enabled to change the selected phase angle of at least one separate demodulating signal in a direction to change the fixed phase difference between said two separate demodulating signals;

said demodulator means being responsive to said demodulating signals for demodulating said chrominance component along said phase sensitive demodulation axes directly related to the phase angles of said demodulating signals; and switch means for selectively enabling and disabling said phase shift means to selectively shift the demodulation axis of said demodulating means.

2. The chrominance channel of claim 1 wherein said phase shift means is effective when enabled to change the selected phase angle of a first demodulating signal to a first different phase angle with respect to said reference component and to change the selected phase angle of a second demodulating signal to a second different phase angle with respect to said reference component, the phase difference between said first different phase angle and said second different phase angle being different than said fixed phase difference.

3. The chrominance channel of claim 2 wherein said reference signal means includes a first phase shift network for phase shifting said first demodulating signal and a second phase shift network for phase shifting said second demodulating signal, and said phase shift means includes impedance means coupled in common with said first and second phase shift networks for relatively changing the phase angle of both said first and second demodulating signals.

4. The chrominance channel of claim 3 wherein said first phase shift network produces a demodulating signal phase leading said reference component and said second phase shift network produces an insertion signal phase lagging said reference component, and said common impedance means comprises impedance means having an impedance value controlled by said switch means to rotate in opposite directions the phase angles of said insertion signals.

5. The invention of claim 1 further comprising hue control means including variable impedance means having a range of impedance values for controlling the phase relationship between said demodulating signals and said chrominance signal, and a reference impedance having a predetermined impedance within said range of impedances, said switch means being effective to substitute said reference impedance for said variable impedance when said phase shift means is enabled to introduce a reference hue.

6. The apparatus of claim 1 further comprising a hue control means including a first variable impedance having a predetermined range of impedance values for introducing a variable phase shift in one of said chrominance signal and demodulating signals, a second impedance connectable in parallel with said variable impedance when said switch is positioned to enable said phase shift means, said switch when positioned to disable said phase to shift means also functioning to remove said second impedance from the circuit.

7. The apparatus of claim 6 wherein said switch, when positioned to disable said phase shift means, further functions to short circuit a portion of said variable impedance to thereby increase the range of obtainable impedance values.

8. In a color television system using a receiver having at least two chroma demodulator stages each sensitive along a different demodulation axis with the angular displacement therebetween having a predetermined value to reproduce an approximate linear transposition of colors transmitted by phase modulation with respect to a reference phase, the improvement for producing a color gamut compression in a selected color quadrant defined by the demodulation axes of said two chroma demodulator stages, comprising:

reference means for providing a reference phase signal corresponding to said reference phase;

phase shift means coupled to said reference means for generating at least two demodulating signals each having a separate phase angle with respect to said reference phase signal, the phase difference between said separate phase angles being different than said predetermined value; and means coupling said phase shift means to said demodulator stages to shift the demodulating axes in a rotational direction relative to each other to narrow the angular displacement therebetween in the selected color quadrant.

9. The improvement of claim 8 wherein said phase shift means generates said two demodulating signals at separate phase angles which narrows said angular displacement in opposed color quadrants containing the generally complementary hues of cyan and orange.

10. A gamut compression circuit for the chrominance channel of a receiver adapted to receive a composite color television signal which includes a chrominance component having a phase variable with respect to a phase reference component to represent chrominance information, said gamut compression circuit comprises:

means for demodulating said chrominance component along at least two different effective demodulation axes to reproduce the transmitted color information and means for selectively, relatively shifting said axes to change the angle therebetween to cause gamut compression in predetermined regions.

11. The apparatus of claim 10 wherein said means for demodulating said chrominance component comprises at first and second phase sensitive demodulators and further comprising means for deriving a pair of demodulating reference signals from said phase reference component, means coupling said demodulating reference components to respective first inputs of said demodulators and said chrominance signal to respective second inputs of said demodulators to cause said first and second demodulators to demodulate said chrominance signal along different respective first and second demodulation axes and phase shift means for selectively varying the phase difference between the signals on one of said respective first and second inputs to thereby vary the angle between said demodulation axes.

12. The apparatus of claim 11 wherein said phase shift means comprises means for selectively varying the phase of at least one of said demodulating reference signals.

13. The apparatus of claim 11 wherein phase shift means comprises means to selectively phase shift both of said demodulating reference signals in opposite directions.

* * * * *